United States Patent [19]

Clostermeyer

[11] Patent Number: 4,563,868
[45] Date of Patent: Jan. 14, 1986

[54] LARGE BALING PRESS FOR AGRICULTURAL PRODUCTS

[75] Inventor: Gerhard Clostermeyer, Gütersloh, Fed. Rep. of Germany

[73] Assignee: Claas Ohg, Harsewinkel, Fed. Rep. of Germany

[21] Appl. No.: 668,073

[22] Filed: Nov. 5, 1984

[30] Foreign Application Priority Data

Nov. 4, 1983 [DE] Fed. Rep. of Germany ....... 3339925

[51] Int. Cl.[4] ............................................. A01D 39/00
[52] U.S. Cl. ...................................... 56/341; 56/364; 100/89
[58] Field of Search .................... 56/341, 343, 364; 100/187, 188 R, 189, 88, 89

[56] References Cited

U.S. PATENT DOCUMENTS

| 3,110,245 | 11/1963 | Kuehlman | 100/187 |
| 4,172,354 | 10/1979 | Vermeer et al. | 100/88 |
| 4,345,421 | 8/1982 | Schwalenberg | 56/341 |

FOREIGN PATENT DOCUMENTS 2653318 6/1978 Fed. Rep. of Germany ........ 56/341

Primary Examiner—Gene Mancene
Assistant Examiner—John G. Weiss
Attorney, Agent, or Firm—Michael J. Striker

[57] ABSTRACT

A large baling press has a pressing chamber peripherally limited by driven winding elements which simultaneously form an inlet opening, and a product supply passage which is limited from below by a prong drum unit and from above by a holding down rack, wherein the rack is oscillatingly moveable in a traveling or product flowing direction.

11 Claims, 1 Drawing Figure

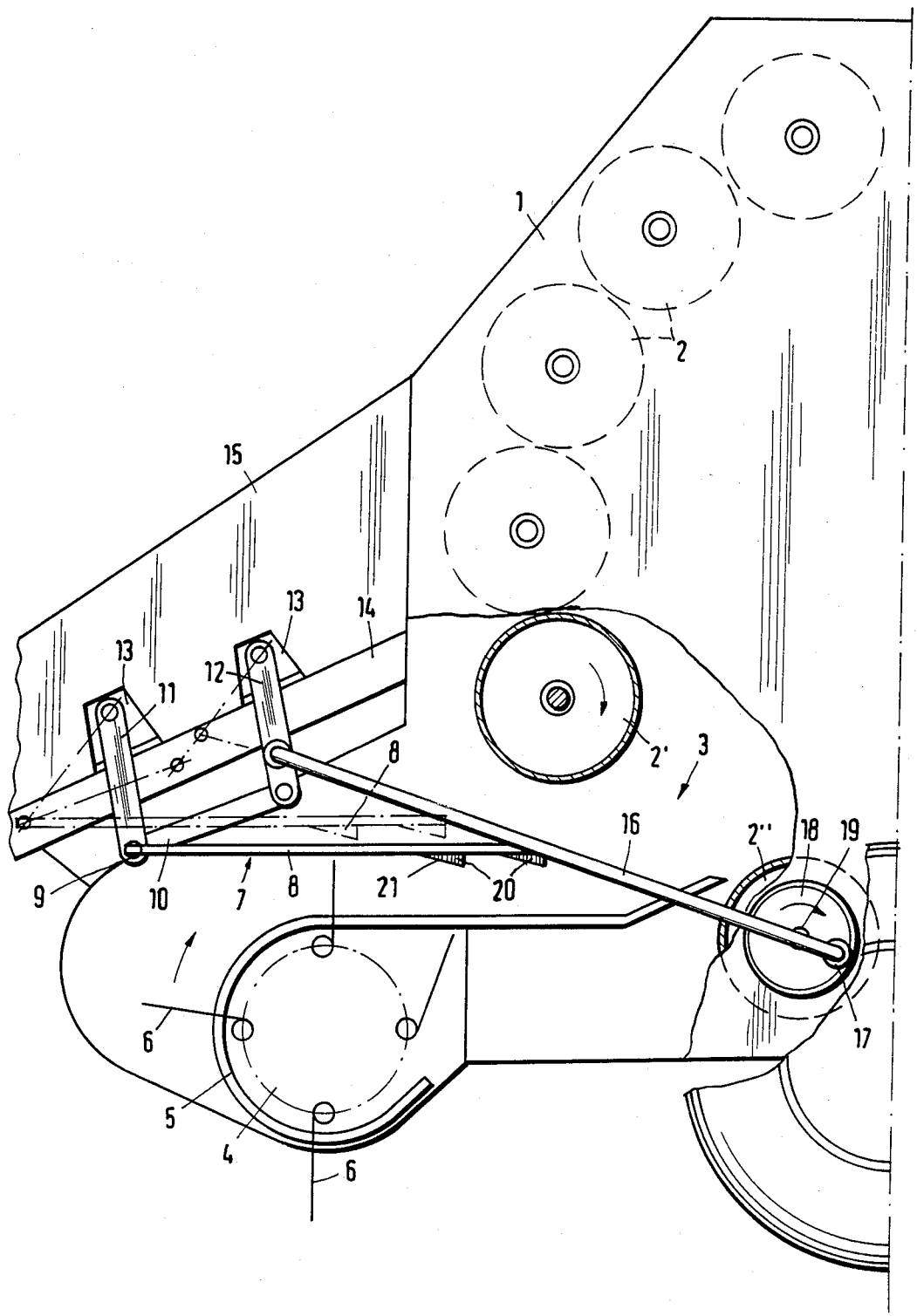

LARGE BALING PRESS FOR AGRICULTURAL PRODUCTS

BACKGROUND OF THE INVENTION

The present invention relates to a large baling press for agricultural products.

Large baling presses of the above-mentioned general type are known in the art. A known large baling press has a pressing chamber which is peripherially limited by driven winding elements some of which simultaneously form an inlet opening, and a product supply passage which is limited at its ground side by a prong drum with a casing partially covering the drum and having a slot for the passage of the prongs, and is also limited from above by a holding down rack. In such large baling presses, and especially in presses for coarse stalk products such as corn straw and in the presses for grass, clogging between the feeding region of the prongs, the pronged drum and the inlet opening of the pressure chamber takes place. This can be attributed to the fact that the prongs from the structural regions do not extend directly to the region of the inlet openings.

SUMMARY OF THE INVENTION

Accordingly, it is an object of the present invention to provide a large baling press for agricultural products, which avoids the disadvantages of the prior art.

More particularly, it is an object of the present invention to provide a large press for agricultural products which satisfies the above-described requirements, particularly in the sense of the uniform product supply to the region of the inlet opening in a satisfactory manner.

In keeping with these objects and with others which will become apparent hereinafter, one feature of the present invention resides, briefly stated, in a large baling press having a pressing chamber limited by winding elements, and a product supply passage limited at its ground side by a prong drum unit and at its upper side by a holding down rack, wherein the holding down rack is arranged so as to perform an oscillating movement in a traveling and product flowing direction.

In accordance with another feature of the present invention, the holding down rack during its oscillating movement in direction toward an inlet opening of the pressing chamber is also lowerable.

When the large baling press is designed in accordance with these features, a product is less compressed and therefore forms a compact mat in which the prongs can engage. Simultaneously, by the movement of the rack the feeding action of the prongs is reinforced.

In accordance with another feature of the present invention, the rack is driven in its reciprocating movement with the aid of two parallel links turnably mounted on lateral walls of the press or lateral frame parts and connected with one another by a coupler, wherein the holding down rack has a plurality of bars which are connected with one another by a transverse rod fixedly connected with the coupler.

In accordance with a further feature of the present invention, the bars which form the holding down rack are arranged parallel to one another and at a distance from one another and connected at their one end with the transverse rod.

For increasing the feeding action of the holding down rack, at least some bars at their ends facing away from the transverse rod carry a pushing element.

It is advantageous when in accordance with still a further feature of the present invention one of the parallel links is connected with one end of a connecting rod whose other end engages with a crank pin, and the crank pin is arranged on a rotatable disk which is connected with one end of a winding roller axle. When the large baling press is designed in accordance with these features, the drive of the holding down rack has a very simple construction.

For providing for a possibility to adjust the turning movement of the holding down rack to the respective harvest conditions, the crank pin is length-adjustable for the purpose of changing a crank radius.

The novel features of the present invention which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing is a view schematically showing a large baling press for agricultural products, in part, in accordance with the present invention.

DESCRIPTION OF A PREFERRED EMBODIMENT

A large baling press in accordance with the present invention is identified as a whole with reference numeral 1. It has a pressing chamber which is limited at its periphery by driven winding rollers 2. Two of these winding rollers, namely the rollers 2' and 2" are arranged at a radial distance therebetween which is greater than the radial distance between the other winding rollers. These winding rollers 2' and 2" therefore form an inlet opening 3.

A prong drum 4 is arranged prior to the inlet opening 3 for product supply. As known, the prong drum 4 is partially covered peripherally by a casing 5 which has a slot for the passage of prongs 6 of the prong drum 4. The casing 5 extends in direction toward the inlet opening 3 for the purpose of unobjectional product guiding.

A rake 7 is provided above the casing 5 and composed of a plurality of individual bars 8 extending parallel to one another. The bars 8 are fixedly connected at their one end with a transverse rod 9. The transverse rod 9 is mounted with its at least one end on a coupler 10. The coupler 10 connects the ends of two parallel links 11 and 12 with one another. The parallel links 11 and 12 are supported with their other ends turnably in consoles 13. The consoles 13, in turn, are connected via a profile member 14 with both front side walls 15.

A connecting rod 16 engages with the parallel link 12 and is driven by a crank pin 17. The crank pin 17 is arranged on a disk 18 in a radially adjustable manner. The disk 18 is fixedly connected with a winding roller axle 19 of the winding roller 2". As a result of this, the rack 7 is driven in reciprocating motion directly from the winding roller 2". As can be seen from the drawing the rack 7 is lowerable when it moves in direction toward the inlet opening 3.

As can be further seen from the drawing, pushing elements 20 are provided. They are welded on the free ends of the springy bars 8 of the rack 7. The pushing elements 20 are formed as wedge-shaped flat iron pieces with product running surfaces 21 which include an acute angle with the bars 8.

As can be seen from the drawing, the rack 7 is lowerable when it moves in direction toward the inlet opening 3. The crank pin 17 is length-adjustable so as to vary a crank radius.

It will be understood that each of the elements described above, or two or more together, may also find a useful application in other types of constructions differing from the types described above.

While the invention has been illustrated and described as embodied as a large bale press for agricultural products, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt if for various applications without omitting features that, from the standpoint of prior art, fairly constitute essential characteristics of the generic of specific aspects of this invention.

What is claimed as new and desired to be protected by Letters Patent is set forth in the appended claims:

1. A large baling press for agricultural products, comprising a plurality of driven winding elements which at least partially limit a pressing chamber and form an inlet opening; means forming a product supply passage before said inlet opening and including prong drum unit limiting said product supply passage at its lower side, and a holding down rack limiting said product supply passage at its upper side, said rack being arranged to perform an oscillating movement in a traveling or product flowing direction and during said movement also to move downwardly in a direction toward said inlet opening so that a product is supplied to said inlet opening by cooperation of said prong drum unit and said holding down rack which limit said product supply passage from above and from below respectively, said rack including a plurality of bars extending parallel to and at a distance from one another and having two ends, and a transverse rod connecting said bars with one another at one of said ends; and a reciprocating coupler connected with said transverse rod.

2. A large baling press as defined in claim 1, wherein said prong drum unit includes a prong drum having a plurality of prongs and a casing at least partially covering said prong drum and having a slot for the passage of said prongs, said casing extending in direction toward said inlet opening.

3. A large baling press for agricultural products, comprising a plurality of driven winding elements which at least partially limit a pressing chamber and form an inlet opening; means forming a product supply passage before said inlet opening and including a prong drum unit limiting said product supply passage at its lower side and a holding down rack limiting said product supply passage at its upper side, said rack being arranged to perform an oscillating movement in a traveling or product flowing direction; a fixed housing part; and means for driving said rack in said reciprocating movement so that a product is supplied to said inlet opening by cooperation of said prong drum unit and said holding down rack which limit said product supply passage from above and from below respectively, said driving means including two parallel links rotatably connected with said fixed housing part and connected with one another by a coupler, said rack including a plurality of bars connected with one another by a transverse rod, said transverse rod being fixedly connected with said coupler.

4. A large baling press as defined in claim 3, wherein said fixed housing part includes two lateral walls, said parallel links being turnably connected with said lateral walls.

5. A large baling press as defined in claim 3, wherein said fixed housing part includes lateral frame parts, said parallel links being turnably connected with said lateral frame parts.

6. A large baling press as defined in claim 3, wherein said bars of said rack extend parallel to and at a distance from one another, said bars each having one end connected with said transverse rod.

7. A large baling press as defined in claim 6, wherein each of said bars of said rack has another end facing away from said transverse rod, at least some of said bars of said rack being provided with a pushing element at the other end thereof.

8. A large baling press as defined in claim 7, wherein said pushing elements have running surfaces extending at an acute angle to the respective bars of said rack.

9. A large baling press as defined in claim 3, wherein said driving means further include a connecting rod having one end connected with one of said parallel links and another end, a crank pin engaging with the other end of said connecting rod, a rotatable disk carrying said crank pin, and an axle provided on one of said winding rollers and supporting said disk for rotation.

10. A large baling press as defined in claim 9, wherein said crank pin is adjustable so as to change a crank radius.

11. A large baling press for agricultural products, comprising a plurality of driven winding elements which at least partially limit a pressing chamber for forming large bales therein and also form an inlet opening; and means forming a product supply passage before said inlet opening and including a prong drum unit limiting said product supply passage at its lower side, and a holding down rack limiting said product supply passage at its upper side, said rack being arranged to perform an oscillating movement in a traveling or product flowing direction and during said movement to move downwardly in a direction toward said inlet opening so that a product is supplied to said inlet opening by cooperation of said prong drum unit and said holding down rack which limit said product supply passage from above and from below respectively.

* * * * *